United States Patent
Poornachandran et al.

(10) Patent No.: US 10,701,489 B2
(45) Date of Patent: Jun. 30, 2020

(54) BINAURAL RECORDING FOR PROCESSING AUDIO SIGNALS TO ENABLE ALERTS

(71) Applicant: Intel Corporation, Santa Clara, CA (US)

(72) Inventors: Rajesh Poornachandran, Portland, OR (US); David Gottardo, Roquefort les Pins (FR); Swarnendu Kar, Hillsboro, OR (US); Saurabh Dadu, Tigard, OR (US); Mark MacDonald, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/251,340

(22) Filed: Jan. 18, 2019

(65) Prior Publication Data

US 2019/0158958 A1     May 23, 2019

Related U.S. Application Data

(63) Continuation of application No. 14/583,631, filed on Dec. 27, 2014, now Pat. No. 10,231,056.

(51) Int. Cl.
*H04R 1/10* (2006.01)
*H04R 3/00* (2006.01)
(Continued)

(52) U.S. Cl.
CPC ............... *H04R 5/04* (2013.01); *G10L 25/30* (2013.01); *G10L 25/51* (2013.01); *H04R 1/1041* (2013.01);
(Continued)

(58) Field of Classification Search
CPC .. H04R 3/00; H04R 3/005; H04R 3/12; H04R 5/00; H04R 5/04; H04R 1/00;
(Continued)

(56) References Cited

U.S. PATENT DOCUMENTS 5,839,109 A * 11/1998 Iwamida ............... G10L 17/26
                                                          704/271
6,240,392 B1 * 5/2001 Butnaru ............... G09B 21/009
                                                          704/271

(Continued)

FOREIGN PATENT DOCUMENTS

JP       2011218826 A     11/2011
WO       2016105620 A      6/2016

OTHER PUBLICATIONS

PCT International Search Report for Related PCT Application PCT/US2015054051 filed Oct. 5, 2015 dated Jan. 22, 2016.

(Continued)

*Primary Examiner* — Thang V Tran
(74) *Attorney, Agent, or Firm* — Hanley, Flight & Zimmerman, LLC

(57) ABSTRACT

A wearable device for binaural audio is described. The wearable device includes a feedback mechanism, a microphone, an always on binaural recorder (AOBR), and a processor. The AOBR is to capture ambient noise via the microphone and interpret the ambient noise. An alert is issued by the processor to the feedback mechanism based on a notification detected via the microphone in the ambient noise.

20 Claims, 6 Drawing Sheets

(51) Int. Cl.
   *H04R 5/00* (2006.01)
   *G10L 25/30* (2013.01)
   *H04S 7/00* (2006.01)
   *H04R 5/04* (2006.01)
   *G10L 25/51* (2013.01)

(52) U.S. Cl.
   CPC .............. *H04S 7/40* (2013.01); *H04R 1/1008* (2013.01); *H04R 2420/01* (2013.01)

(58) Field of Classification Search
   CPC .......... H04R 1/02; H04R 1/10; H04R 1/1008; H04R 1/1041; H04R 1/1083; H04R 27/00; H04R 2420/01; G10L 25/30; G10L 25/51; G10L 25/78; H04S 7/40; G06F 3/165; H04B 1/385; H03G 3/32
   See application file for complete search history.

(56) References Cited

U.S. PATENT DOCUMENTS

| | | | |
|---|---|---|---|
| 8,150,044 B2* | 4/2012 | Goldstein | H04R 25/453 381/317 |
| 9,271,077 B2 | 2/2016 | Usher et al. | |
| 10,231,056 B2 | 3/2019 | Poornachandran et al. | |
| 2004/0155770 A1 | 8/2004 | Nelson et al. | |
| 2008/0102902 A1 | 5/2008 | Epley | |
| 2008/0240458 A1 | 10/2008 | Goldstein et al. | |
| 2008/0267416 A1* | 10/2008 | Goldstein | H04R 1/1091 381/56 |
| 2009/0010464 A1 | 1/2009 | Kornagel | |
| 2010/0177193 A1 | 7/2010 | Flores | |
| 2010/0290632 A1 | 11/2010 | Lin | |
| 2010/0302033 A1* | 12/2010 | Devenyi | H04R 1/1041 340/540 |
| 2011/0026724 A1 | 2/2011 | Doclo | |
| 2011/0075835 A1 | 3/2011 | Hill | |
| 2012/0108215 A1 | 5/2012 | Kameli | |
| 2012/0148060 A1 | 6/2012 | Isberg | |
| 2012/0257764 A1 | 10/2012 | Sung et al. | |
| 2013/0120124 A1 | 5/2013 | Lancaster et al. | |
| 2013/0279726 A1 | 10/2013 | Baughman et al. | |
| 2014/0044269 A1 | 2/2014 | Anderson | |
| 2015/0172814 A1 | 6/2015 | Usher et al. | |
| 2015/0338919 A1 | 11/2015 | Weber et al. | |
| 2016/0163168 A1 | 6/2016 | Brav et al. | |
| 2016/0192073 A1 | 6/2016 | Poornachandran et al. | |
| 2016/0255446 A1 | 9/2016 | Bernardi et al. | |

OTHER PUBLICATIONS

United States Patent and Trademark Office, "Restriction Requirement," dated Jun. 16, 2016 in connection with U.S. Appl. No. 14/583,631, 6 pages.

United States Patent and Trademark Office, "Non-Final Office Action," dated Apr. 7, 2017 in connection with U.S. Appl. No. 14/583,631, 9 pages.

United States Patent and Trademark Office, "Final Office Action," dated Sep. 21, 2017 in connection with U.S. Appl. No. 14/583,631, 7 pages.

United States Patent and Trademark Office, "Non-Final Office Action," dated Apr. 2, 2018 in connection with U.S. Appl. No. 14/583,631, 8 pages.

United States Patent and Trademark Office, "Notice of Allowance," dated Oct. 26, 2018 in connection with U.S. Appl. No. 14/583,631, 11 pages.

United States Patent and Trademark Office, "Corrected Notice of Allowability," dated Nov. 15, 2018 in connection with U.S. Appl. No. 14/583,631, 2 pages.

International Searching Authority, "Written Opinion," dated Jan. 22, 2016 in connection with International Patent Application No. PCT/US2015/054051, 9 pages.

* cited by examiner

200

300

500

BINAURAL RECORDING FOR PROCESSING AUDIO SIGNALS TO ENABLE ALERTS

CROSS REFERENCE TO RELATED APPLICATION

This patent arises from a Continuation Application of U.S. patent application Ser. No. 14/583,631, by Poornachandran et al., entitled "Binaural Recording for Processing Audio Signals to Enable Alerts," filed Dec. 27, 2014, now U.S. Pat. No. 10,231,056, and which is incorporated herein by reference.

TECHNICAL FIELD

The present disclosure relates generally to techniques for processing an audio signal to reduce background noise. More specifically, the present techniques relate to processing audio signals to enable alerts.

BACKGROUND ART

When listening to an audio playback, background noise may be overpowered by the audio playback. For example, a user may listen to music using headphones that drown out background noise. The headphones may assist the user in focusing on a particular task. Some headsets physically drown out background noise by creating a barrier between the user and the external, background noise. While headphones and speakers can enable a user to be isolated from background noise or distractions, crucial conversations, notifications, or warnings that occur as a portion of the background noise may not be heard.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As headphones and speakers can enable a user to be isolated from background noise or distractions, crucial conversations, notifications, or warnings that occur as a portion of the background noise may not be heard. The present techniques disclose an Always On Binaural Recording (AOBR) that can be used to enable alerts or recorded messages. In embodiments, a system includes a plurality of speakers and a plurality of microphones. The plurality of microphones may be used for a binaural audio recording. The recording can be processed in real time to determine if any notification condition is present in the background noise.

Figure 1:
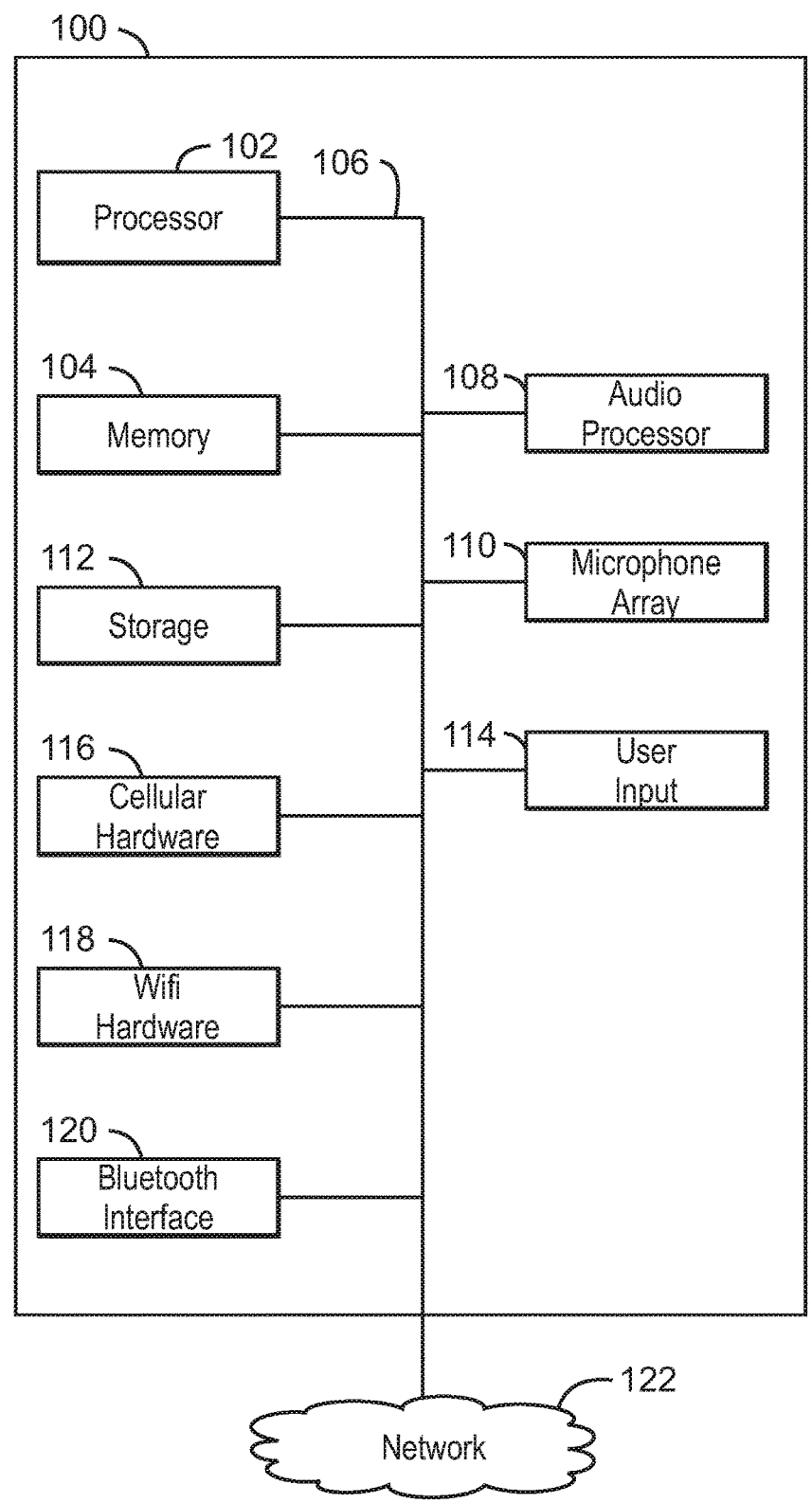
FIG. 1 is a block diagram of an electronic device that enables an Always On Binaural Recording.

FIG. 1 is a block diagram of an electronic device that enables an Always On Binaural Recording for processing audio signals to deliver alerts in real-time. While the binaural audio recording is referred to as "always" on, in some embodiments the binaural recording may be "normally" on, or on as necessary. Always on, in embodiments, is a state of the binaural audio recording where audio is captured regardless of a power state of the electronic device. However, in some power states, the electronic device may be powered off entirely. The electronic device 100 may be, for example, a laptop computer, tablet computer, mobile phone, smart phone, a wearable headset, a smart headset, a smart glass or speaker system, among others. In embodiments, a user's headset is a "smart" headset in that there is an "always listening mode" that listens to background audio looking for key words, learned voice patterns, and recognizable notifications by using a binaural recording capability with two or more microphones. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM). In embodiments, the processor is to perform a binaural recording capability. Additionally, in embodiments, the electronic device includes a binaural recorder, where the binaural recorder is a processor, microcontroller, platform controller hub, and the like.

The electronic device 100 can also include an audio processing device 108. The audio processing device 108 can be configured to perform any number of audio processing operations, such as encoding or decoding audio data, retrieving audio files for rendering the audio on a sound system of the electronic device 100, audio equalization, and any other audio processing. For example, the audio processing device 108 can process background noise from a microphone array 110. The audio processing device 108 can render an audio sound according to the particular background noise processed by the audio processing device 108. In some cases, the audio processing device 108 is an audio classifier.

Accordingly, the electronic device 100 also includes a microphone array 110 for capturing audio. The microphone array 110 can include any number of microphones, including two, three, four, five microphones or more. In some embodiments, the microphone array 110 can be used together with a camera to capture synchronized audio/video data, which may be stored to a storage device 112 as audio/video files. The electronic device 100 can also include one or more user input devices 114, such as switches, buttons, a keyboard, a mouse, or trackball, among others. One of the input devices may be a touchscreen, which may be integrated with a display. The input devices 114 may be built-in components of the electronic device 100, or may be devices that are externally connected to the electronic device 100.

The storage device 112 is a physical memory such as a hard drive, an optical drive, a flash drive, an array of drives, or any combinations thereof. The storage device 112 can store user data, such as audio files, video files, audio/video files, and picture files, among others. The storage device 112 can also store programming code such as device drivers, software applications, operating systems, and the like. The programming code stored to the storage device 112 may be executed by the CPU 102, audio processor 108, or any other processors that may be included in the electronic device 100, such as a graphics processing unit (GPU).

The audio processing device 108 may also enable beam forming. Beam forming may be used to focus on retrieving data from a particular audio source, such as a person speaking. To enable beam forming, the audio processing device 108 may controls a directionality of the microphone array 110 by receiving audio signals from individual microphones of the microphone array 110 and processing the audio signals in such a way as to amplify certain components of the audio signal based on the relative position of the corresponding sound source relative to the microphone array 110. For example, the directionality of the microphone array 110 can be adjusted by shifting the phase of the received audio signals and then adding the audio signals together. Processing the audio signals in this way creates a directional audio pattern such sounds received from some angles are more amplified compared to sounds received from other angles. As used herein, the beam of the microphone array is the direction in which the received audio signal will be amplified the most. The microphones can also be combined to form separate arrays, each array having a different audio pattern. For example, with three microphones A, B, and C, microphones A and B can be used to form a first array, microphones B and C can be used to form a second array, and microphones A and C can be used to form a third array. Control over the directionality of the microphone array 110 will be determined, at least in part, by the number of microphones and their spatial arrangement on the electronic device 100. Although beam-forming described as determining the audio source, any sound localization technique can be used. For example, sound localization techniques such as MUSIC, ESPRIT, blind source separation, and the like may be used to determine a location or direction of sound.

The CPU 102 may be linked through the bus 106 to cellular hardware 116. The cellular hardware 116 may be any cellular technology, for example, the 4G standard (International Mobile Telecommunications-Advanced (IMT-Advanced) Standard promulgated by the International Telecommunications Union-Radio communication Sector (ITU-R)). In this manner, the PC 100 may access any network 126 without being tethered or paired to another device, where the network 122 is a cellular network.

The CPU 102 may also be linked through the bus 106 to WiFi hardware 118. The WiFi hardware is hardware according to WiFi standards (standards promulgated as Institute of Electrical and Electronics Engineers' (IEEE) 802.11 standards). The WiFi hardware 118 enables the wearable electronic device 100 to connect to the Internet using the Transmission Control Protocol and the Internet Protocol (TCP/IP), where the network 122 is the Internet. Accordingly, the wearable electronic device 100 can enable end-to-end connectivity with the Internet by addressing, routing, transmitting, and receiving data according to the TCP/IP protocol without the use of another device. Additionally, a Bluetooth Interface 120 may be coupled to the CPU 102 through the bus 106. The Bluetooth Interface 120 is an interface according to Bluetooth networks (based on the Bluetooth standard promulgated by the Bluetooth Special Interest Group). The Bluetooth Interface 120 enables the wearable electronic device 100 to be paired with other Bluetooth enabled devices through a personal area network (PAN). Accordingly, the network 122 may be a PAN. Examples of Bluetooth enabled devices include a laptop computer, desktop computer, ultrabook, tablet computer, mobile device, or server, among others.

The block diagram of FIG. 1 is not intended to indicate that the computing device 100 is to include all of the components shown in FIG. 1. Rather, the computing system 100 can include fewer or additional components not illustrated in FIG. 1 (e.g., sensors, power management integrated circuits, additional network interfaces, etc.). The computing device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

In embodiments, the electronic device 100 of FIG. 1 is a portable music player. A user can listen to music from the portable music player via noise cancelling head phones. For example, a user can walk a trail while listening to music from the portable music player via the noise cancelling head phones. In such an example, the user is completely isolated from any external background noise. The user can miss audio cues from a second person jogging, riding bike, or skating behind the user that requests room to pass by the user. Typically, the second person would say "on your left/right." By using an AOBR, the electronic device can alert the user to audio cues from a second person. The AOBR can also alert the user to other auditory environmental cues that the user may miss, such as police sirens, ambulance sirens, and the like. Similarly, the user could be at home with music playing loudly from the speakers of a personal computer, or the user could listen to music from the personal computer through a set of noise canceling headphones. The user can miss someone knocking on the door or ringing a door bell. However, the AOBR can alert the user to the occurrence of the knock on the door or ringing of the door bell.

With the AOBR, when a keyword match, learnt voice pattern match, or recognizable notification match occurs, the volume of the audio currently being played for the user is reduced, and alerts are provided to the user based on the user configuration. For example, an alert could be a beep, or voice. In embodiments, the ABOR can determine the direction of the background audio and alert the user about the direction from which the audio came. For example, an alert provided to the user could state "There was a knock from the left", which can help the user if it is the front door or the side door that someone knocked on. In another example, an alert provided to the user could state "Someone called out your name from 2'o clock from north direction", which can help the user look in the right direction.

Further, ABOR can record the notification that occurs in the background audio, and the play back the audio in the same manner to the user as if user had the opportunity to listen to the original audio. In other words, the AOBR can preserve the fidelity and the directional/binaural information of the notification in the background audio while recording it and then replicate it over stereo speakers. For example, a user named Alice may be traveling on a train with loud music playing from the Alice's headset. A second person could make the comment that "Alice didn't hear that." With AOBR, Alice's headset would the comment "Alice didn't hear that" by recognizing that Alice's name was said. The comment "Alice didn't hear that" would then be replayed along with additional audio from the background noise immediately preceding the comment "Alice didn't hear that." With this additional audio, Alice can look in the correct direction and, in addition, know exactly what was asked or said so that she doesn't have to ask the preceding audio to be repeated. Moreover, in embodiments, AOBR is to prioritize and deliver recorded messages based on urgency, or based on a user configuration.

Figure 2:
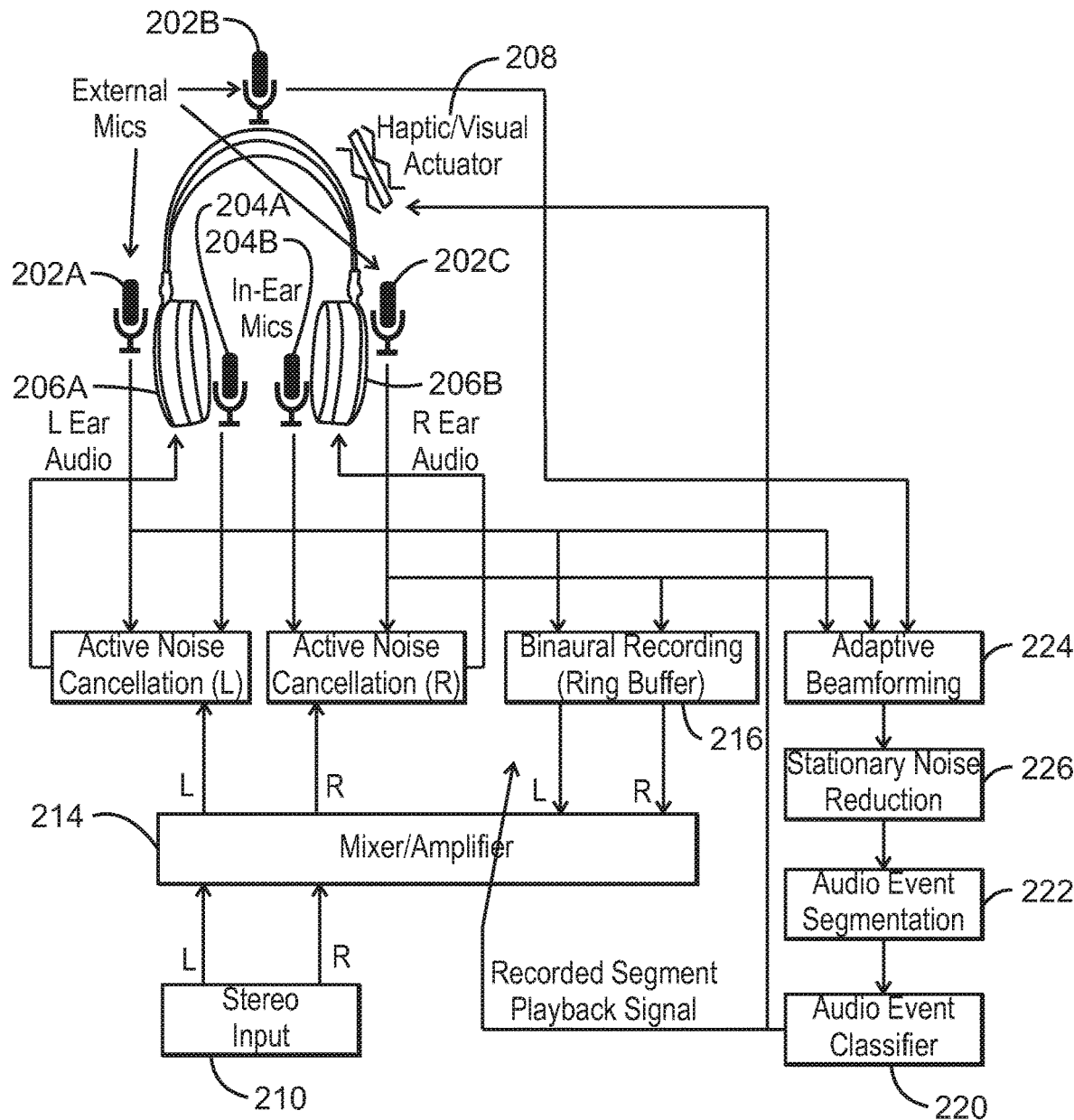
FIG. 2 is an illustration of the architecture of a smart headset with AOBR capability.

FIG. 2 is an illustration of the architecture of a smart headset 200 with AOBR capability. As illustrated, the smart headset 200 includes three external microphones 202A, 202B, and 202C, and two internal in-ear microphones 204A and 204B. The smart headset also includes a left speaker 206A to provide left ear audio and a right speaker to provide right ear audio.

Traditional noise-cancelling headphones use audio data from external and internal microphones to perform active noise cancellation. In traditional noise-cancelling headphones, an effective "anti-noise" is added to both the left and right channels of a stereo player before feeding into the ears. As illustrated in FIG. 2, the stereo input 210 is mixed with recorded audio from the external microphones 202A and 202C at a mixer/amplifier 214 before feeding the audio to the speakers 206A and 206B. The stereo input could be from an electronic device such as a music player, personal computer, mobile phone, tablet device, and the like. The recorded audio from the external microphones 202A and 202C is also stored at a binaural recording buffer 216. The binaural recording buffer 216 can recreate the same audio scenery, preserving the directionality of sound that the user would have noticed, had the user not worn the headphone device. In embodiments, when a notification in the recorded audio from the external microphones 202A and 202C is detected, audio from the binaural recording buffer can be used to replay the recorded audio that contained the notification.

The replayed audio may be lower quality background audio, while the current audio that the user is listening to is a higher quality foreground audio recording. This results in a more immersive audio experience playback, and the replayed audio may be combined with a video recording. In embodiments, a recorder can post process which aspects/sounds are to be highlighted in the audio recording along with the appropriate spatial information.

The mixer/amplifier 214 is switched between a stereo playback mode from the stereo input 210 or the recorded audio playback mode from the binaural recording buffer 216 based on a control signal 218 provided by an audio event classifier 220. The audio event classifier 222 can detect events such as a dog barking, door bell ringing, tire screeching, the user being called by name, and the like. An audio event segmentation 222 is input to the audio event classifier 220. The audio event segmentation 222 outputs a segmented clip of audio to the audio event classifier 220 that has been cleaned. In particular, audio is cleaned through an adaptive beam former 224. Adaptive beam forming is executed via a sequence of directional beam forming. Specifically, the adaptive beam former can focus on a particular audio source for a clearer reception of the incoming audio. The beam formed audio is then sent through a stationary noise reduction 226. The stationary noise reduction 226 suppresses loud sources of sustained but benign noise such as fans, lawn mowers, traffic noise, wildlife noise, and the like. In embodiments, the audio event classifier can exempt certain identifiable noises from noise reduction. For example, the classification could have exceptions to exclude police car, fire truck, and ambulance siren alerts. Once an audio event is detected from the cleaned audio at the audio event segmentation 222, haptic or visual feedback may be provided by the haptic/visual actuator 208, in conjunction with the audio feedback. For example, the smart headset 200 is a set of wearable glasses where the haptic or visual feedback from a haptic/visual actuator 208 is rendered on a lens of the wearable glasses. Further, in examples, the smart headset 200 is a set of headphones connected to a music player with a display screen. The haptic or visual feedback from the haptic/visual actuator 208 can be rendered on the display screen of the music player.

In embodiments, the smart headset 200 may include sufficient storage space sufficient for storing the binaural audio recording. The stored binaural audio enables the user to recreate the original binaural experience if they want to listen to the background audio that was missed. This stored binaural audio may be useful in circumstances where the user wants to listen to a full conversation without asking what was missed, especially when the user is dealing with babies cute initial words or elderly people urgent needs.

Figure 3:
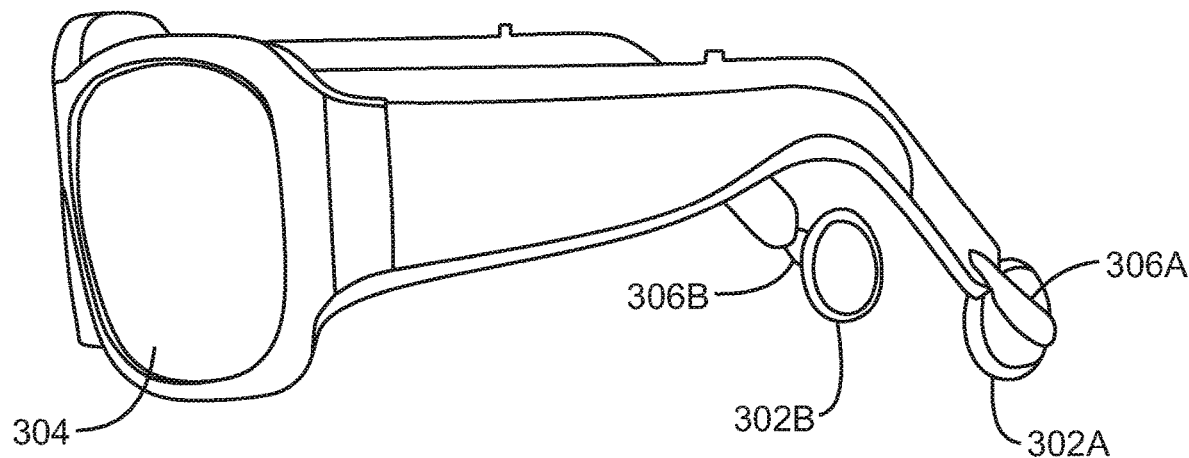
FIG. 3 is an illustration of a wearable headset that enables always on binaural recording.

FIG. 3 is an illustration of a wearable headset 300 that enables always on binaural recording. The headset 300 includes integrated stereo speakers 302A and 302B. The headset 300 also includes lenses 304. In this manner, the headset 300 can function as a set of smart glasses. A pair of high fidelity recording microphones 306A and 306B are integrated into the existing speaker structures. The microphones 306A and 306B can be located at the ear canal locations similar to the speakers 302A and 302B. Recordings made from the ear canal location by the microphones 306A and 306B will be similar to those actually heard by a user. The recordings are made with binaural head recording. A binaural head is a noise measurement technique that uses a mannequin-like head with microphones placed at the ears. Acoustic waves recorded by microphones placed at the ears are distorted slightly by their interactions with the shape of the microphone head, in a manner similar to what a human listener would experience. Moreover, the acoustic waves recorded by the microphones placed at the ears are distorted in a way that essentially encodes the source direction information, since human observers can determine whether a sound is from above, behind, or in front of them, and not just from the left or right. Human observers determine this information via brain post-processing on the subtle distortions within the acoustic waves. As a result, playback of a true binaural recording delivers to the user a true three dimensional experience of the sound, even using only a stereo headset.

Figure 4:
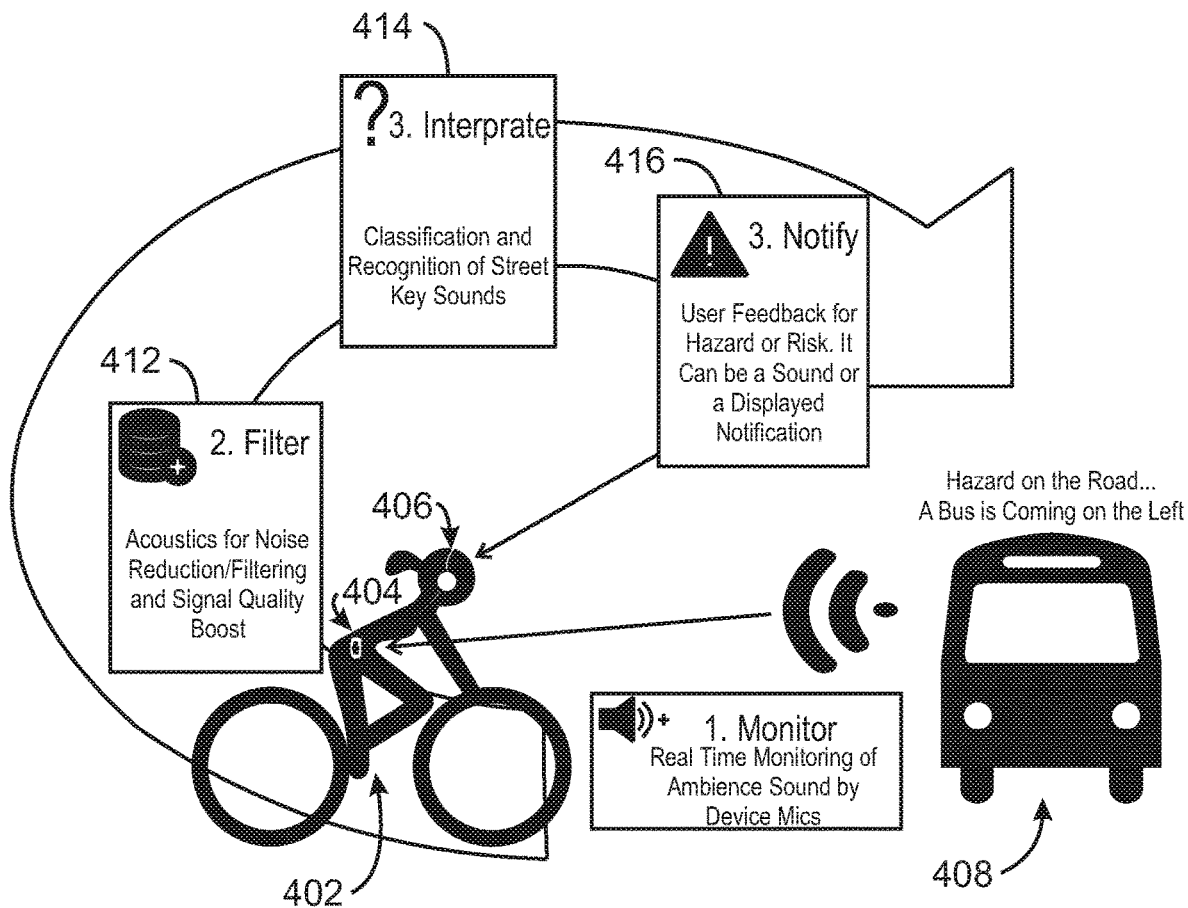
FIG. 4 is an illustration of the use of the Always On Binaural Recording.

FIG. 4 is an illustration of the use of the Always On Binaural Recording. A user 402 is riding a bicycle while listening to a music player 404 via headphones 406. For purposes of example, a bus 408 is illustrated as the source of a notification to the user 402, who may not hear the bus 408 if music from the music player 404 is played at a high volume through the headphones 406.

At block 410, the background noise is monitored. The background noise may also be considered any ambient sounds. In embodiments, the any ambient sound is captured in real time and in a low power mode. Any number of microphones can be used to monitor and capture the background noise and any ambient sounds. In embodiments, the number of microphones as well as the quality of capture shall be well adapted and match the requirements as needed to filter and interpret any detected notification.

At block 412, the captured audio is filtered in real time and in a low power mode. In embodiments, filtering the audio includes beam forming between to focus on a particular audio source and noise reduction as described in FIG. 2. Additionally, filtering the audio can remove or reduce the noise sounds, such as like winds, and isolate or emphasize the useful ambient sound. In embodiments, the useful ambient sound can be emphasized though the use of boost algorithms. At block 414, the ambient noise is interpreted through classification and recognition. Filtering the audio enables a clean signal to be interpreted. In embodiments, the ambient sounds are interpreted by comparing the ambient sounds with a catalogue of classified sounds. This classification of sounds may be stored locally in a database of the music player 404 or the headphones 406, depending on the design on the wearable device. The interpretation of the ambient sounds can then be performed locally at the music player 404 or the headphones 406 using algorithms such as convolution. In particular, algorithms based on a convolutional neuronal network can be used to interpret the ambient sounds so that matching can occur. For example, a convolutional neural network can consist of multiple layers of small neuron collections which can analyze small portions of the ambient noise. The results of these collections are then tiled so that they overlap to obtain a better representation of the audio in the ambient noise. This tiling can be repeated for every such layer of the convolutional neural network.

The database of classified sounds used for matching with the ambient sounds may be context dependent to accelerate the interpretation of the ambient noise. The context may be derived from the type of device using the AOBR. For example, a small music player may have different contexts or circumstances of use than a laptop. Moreover, the context may be derived from form context awareness and geo-localization. For example, a device may include sensors to determine if the user is walking, biking, skiing. Several catalogues of classified sounds may be stored locally on the wearable device. The catalogues of classified sounds may include, but are not limited to city street database, outdoor country database, specific factory sounds database, and the like. Accordingly, the city street database can be used for matching when a user is located on city streets, and the outdoor country database can be used for matching when a user is located in the outdoors or country. Similarly, the specific factory sounds database can be used by workers in a factory setting that may need to be alerted based on audible notifications within the factory. The catalogue of sounds can be generated based on the user's particular settings or use cases. Moreover, the AOBR can leverage geo-tagging for the user's particular settings or use cases. For example, based on user device's current GPS location, AOBR can fine tune the expected ambient noise, such as in a mall, on a trail, on road, etc.

At block 416, the user is notified of an event that occurred in the background noise. The user can be notified in a secure manner via an alert. The alert to the user can be a sound, a vibration, information displayed to the user, or any combination thereof. The type of alert may depend on the context of use and the particular device being used. As illustrated in FIG. 4, an alert sound may be played through the headphones 406. For example, the sound could be a "beep" or a voice announcing "a bus is approaching from the left." The volume of the audio being played to the user through the headphones 406 can be reduced, or the audio can be paused in order to render the alert sound. The present techniques thereby ensure the user has received and understood the alert without being disturbed.

Figure 5:
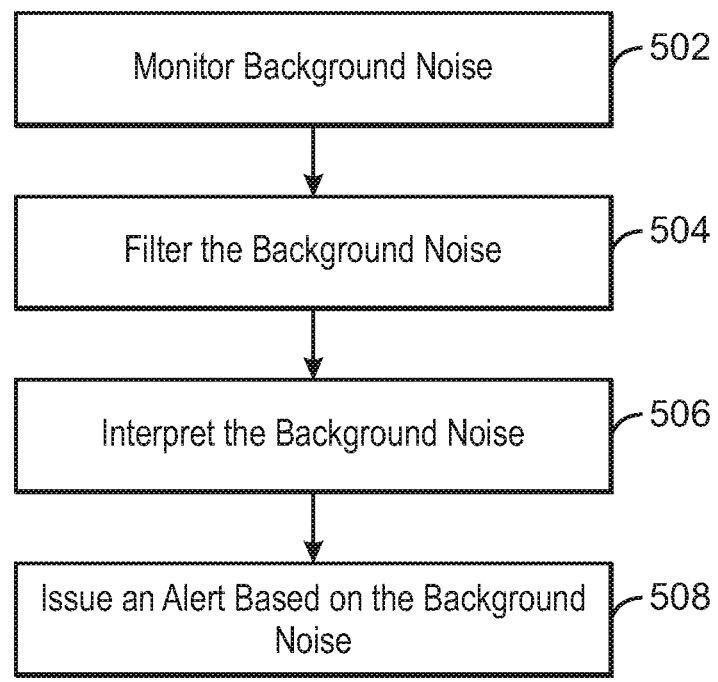
FIG. 5 is a process flow diagram of a method for an always on binaural recording of a wearable device.

FIG. 5 is a process flow diagram of a method for an always on binaural recording of a wearable device. At block 502, the background noise is monitored. In embodiments, the background noise is monitored via an Always On Binaural Recording (AOBR). In embodiments, audio from the AOBR is stored in a buffer. At block 504, the background noise is filtered in order to improve the quality of the monitored background noise.

At block 506, the background noise is interpreted. In embodiments, the background noise can include a notification that is interpreted by comparing the notification to a catalogue of classified sounds. The catalogue of classified sounds may be tailored for the particular context of use of the wearable device. At block 508, an alert is issued to the user based on a match between the notification and the catalogue of classified sounds. The alert may be a sound, a vibration, or a visual alert. In this manner, AOBR enables a user to be alerted to various notifications that occur in the background noise.

Figure 6:
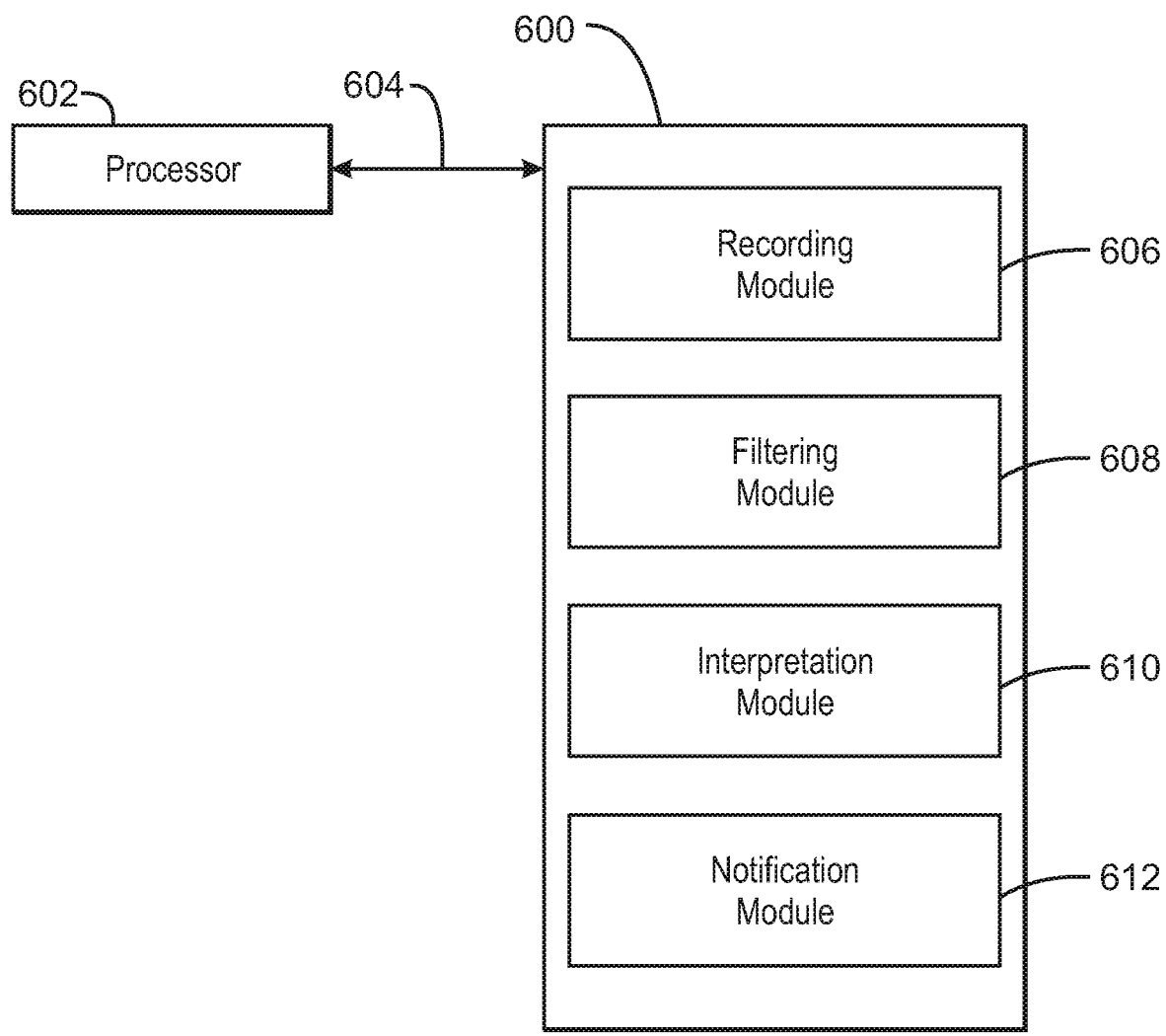
FIG. 6 is a block diagram showing a medium 600 that contains logic for always on binaural recording.

FIG. 6 is a block diagram showing a medium 600 that contains logic for always on binaural recording. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606-612 configured to perform the techniques described herein. For example, a recording module 606 may be configured monitor the background noise. A filtering module 608 may be configured to filter the background noise. An interpretation module 610 may be configured to interpret any notification in the background noise. An notification module 612 may be configured to alert a user depending on the particular notification discovered in the background noise. In some embodiments, the modules 607-612 may be modules of computer code configured to direct the operations of the processor 602.

The block diagram of FIG. 6 is not intended to indicate that the medium 600 is to include all of the components shown in FIG. 6. Further, the medium 600 may include any number of additional components not shown in FIG. 6, depending on the details of the specific implementation.

Example 1

A wearable device for binaural audio is described herein. The wearable device comprises a feedback mechanism, a microphone, a binaural recorder, and a processor. The binaural recorder is to capture ambient noise via the microphone and interpret the ambient noise. The processor is to issue an alert to the feedback mechanism based on a notification detected via the microphone in the ambient noise.

The feedback mechanism may be a speaker, a vibration source, a heads up display, or any combination thereof. The alert may be a replay of the ambient noise. The ambient noise may be interpreted using a convolutional neural network. The ambient noise may also be interpreted using a convolution algorithm. The captured ambient noise may be filtered. The alert may be a sound, vibration, a displayed alert, or any combination thereof. A location and direction of the notification may be determined using sound localization. The sound localization may be beam-forming. The ambient noise may be interpreted by comparing a notification detected in the ambient noise to a catalogue of classified sounds.

Example 2

A method for an always on binaural recording is described herein. The method comprises monitoring a background noise and filtering the background noise. The method also comprises interpreting the background noise to determine a notification in the background noise, and issuing an alert based on the notification in the background noise.

The background noise may be monitored via an Always On Binaural Recoding. Filtering the background noise may to improve the quality of the monitored background noise. The notification may be interpreted by comparing the notification to a catalogue of classified sounds. The catalogue of classified sounds may be tailored for the particular context of use of the wearable device. Geo-tagging may be used to determine a catalogue of classified sounds. The alert may be issued to the user based on a match between the notification and a catalogue of classified sounds. The alert may be a sound, a vibration, or a visual alert. The background audio may be filtered in real time and in a low power mode.

Example 3

A system for binaural audio is described herein. The system comprises a display, a speaker, a microphone, and a memory that is to store an ambient noise or visual effect, and that is communicatively coupled to the display and the speaker. The system also comprises a processor communicatively coupled to the radio and the memory, wherein when the processor is to execute the instructions, the processor is to capture and interpret ambient noise and issue an alert via the speaker based on the ambient noise.

A stationary noise reduction may suppress sources of sustained noise. Emergency notifications may be excluded from suppression by the stationary noise reduction. The alert may be a replay of the ambient noise. The alert may be prioritized and delivered to a user based on priority. The alert may be prioritized and delivered to a user based on a user configuration The interpreting may include convolution. The notification may be interpreted using a convolutional neural network. The processor also filters the ambient noise to produce an audio sample.

Example 4

A non-transitory, computer readable medium is described herein. The non-transitory, computer readable medium comprises a recording module, wherein the recording module is to monitor a background noise, and a filtering module, wherein the filtering module is to filter the background noise. The non-transitory, computer readable medium also comprises an interpretation module, wherein the interpreting module is to interpret the background noise to determine a notification in the background noise, and a notification module, wherein the notification module is to issue an alert based on the notification in the background noise.

The background noise may be monitored via an Always On Binaural Recoding. Filtering the background noise may improve the quality of the monitored background noise. The notification may be interpreted by comparing the notification to a catalogue of classified sounds. Filtering the background noise may improve the quality of the monitored background noise. The notification may be interpreted by comparing the notification to a catalogue of classified sounds. The catalogue of classified sounds may be tailored for the particular context of use of the wearable device. Geo-tagging may determine a catalogue of classified sounds. The alert may be issued to the user based on a match between the notification and a catalogue of classified sounds. The alert may be a sound, a vibration, or a visual alert. The background audio may be filtered in real time and in a low power mode.

Example 5

An apparatus is described herein. The apparatus comprises a means for feedback, a microphone, and a means to capture ambient noise via the microphone and interpret the ambient noise. The apparatus also comprises a processor, wherein an alert is issued to the feedback mechanism based on a notification detected via the microphone in the ambient noise.

The means for feedback may be a speaker, a vibration source, a heads up display, or any combination thereof. The alert may be a replay of the ambient noise. The ambient noise may be interpreted using a convolutional neural network. The ambient noise may be interpreted using a convolution algorithm. The captured ambient noise may be filtered. The alert may be a sound, vibration, a displayed alert, or any combination thereof. A location and direction of the notification may be determined using sound localization. The sound localization may be beam-forming. The ambient noise may be interpreted by comparing a notification detected in the ambient noise to a catalogue of classified sounds.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for an always on binaural recording, comprising:
   monitoring a background noise;
   storing the background noise in memory;
   filtering the background noise; interpreting the background noise by comparing the background noise to a catalogue of classified sounds stored locally to detect a notification; and
   issuing an alert via a feedback mechanism based on the notification detected in the background noise, the alert to preserve directional information of the notification and to include a replay of the background noise stored in the memory.

2. The method of claim 1, wherein the background noise is monitored via an Always On Binaural Recoding.

3. The method of claim 1, wherein the filtering of the background noise improves a quality of the monitored background noise.

4. The method of claim 1, wherein the feedback mechanism is a speaker, a vibration source, a heads-up display, or any combination thereof.

5. The method of claim 1, wherein the catalogue of classified sounds is tailored for a particular context of use of a wearable device.

6. The method of claim 1, wherein geo-tagging is used to determine the catalogue of classified sounds.

7. The method of claim 1, wherein the alert is issued to a user based on a match between the notification and the catalogue of classified sounds.

8. The method of claim 1, wherein the alert further includes a sound, a vibration, a displayed alert, or any combination thereof.

9. The method of claim 1, wherein the directional information of the notification is determined using sound localization techniques at a processor.

10. The method of claim 1, wherein the alert further includes a direction of a source of the notification.

11. A system for binaural audio, comprising:
    a display;
    a speaker;
    a microphone;
    memory to store an ambient noise captured by the microphone, the memory in circuit with the display and the speaker; and
    a processor in circuit with the memory, the processor to execute instructions to:
    capture the ambient noise;
    interpret the ambient noise captured by the microphone by comparing the ambient noise to a catalogue of classified sounds stored locally to detect a notification; and
    issue an alert via the speaker based on the notification detected in the ambient noise, the alert to preserve directional information of the notification and to include a replay of the ambient noise stored in the memory.

12. The system of claim 11, further including stationary noise reduction circuitry to suppress sources of sustained noise.

13. The system of claim 11, further including stationary noise reduction circuitry to suppress sources of sustained noise, emergency notifications to be excluded from suppression by the stationary noise reduction circuitry.

14. The system of claim 11, wherein the alert is prioritized and delivered to a user based on priority.

15. The system of claim 11, wherein the alert is prioritized and delivered to a user based on a user configuration.

16. The system of claim 11, wherein the processor is to interpret a convolution that enables matching between the ambient noise and the catalogue of classified sounds.

17. The system of claim 11, wherein the processor is to interpret the alert using a convolutional neural network.

18. The system of claim 11, wherein the processor is to filter the ambient noise to produce an audio sample.

19. The system of claim 11, wherein the processor is to determine the directional information of the notification using sound localization techniques.

20. The system of claim 11, wherein the alert further includes a direction of a source of the notification.

* * * * *